(12) United States Patent
Quenu et al.

(10) Patent No.: US 11,872,617 B2
(45) Date of Patent: Jan. 16, 2024

(54) MANUFACTURE OF ANNULAR SECTORS FOR PRODUCING AN AIR INTAKE LIP

(71) Applicant: SAFRAN NACELLES, Gonfreville l'Orcher (FR)

(72) Inventors: Fabienne Quenu, Moissy-Cramayel (FR); Vincent Dutot, Moissy-Cramayel (FR); Bertrand Pierre Martin Leroyer, Moissy-Cramayel (FR); François Taillard, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 0 days.

(21) Appl. No.: 18/248,814

(22) PCT Filed: Oct. 20, 2021

(86) PCT No.: PCT/FR2021/051832
§ 371 (c)(1),
(2) Date: Apr. 12, 2023

(87) PCT Pub. No.: WO2022/084628
PCT Pub. Date: Apr. 28, 2022

(65) Prior Publication Data
US 2023/0302520 A1    Sep. 28, 2023

(30) Foreign Application Priority Data

Oct. 21, 2020 (FR) ........................ 2010781

(51) Int. Cl.
*B21D 26/033* (2011.01)
*B21D 51/10* (2006.01)
(Continued)

(52) U.S. Cl.
CPC ......... *B21D 26/033* (2013.01); *B21D 26/047* (2013.01); *B21D 51/10* (2013.01);
(Continued)

(58) Field of Classification Search
CPC .. B21D 26/021; B21D 26/031; B21D 26/033; B21D 26/047; B21D 51/02; B21D 51/10;
(Continued)

(56) References Cited

U.S. PATENT DOCUMENTS

| | | | |
|---|---|---|---|
| 2004/0050908 A1 | 3/2004 | Kendall et al. | |
| 2007/0186612 A1* | 8/2007 | Stewart | B21D 25/02 72/302 |

(Continued)

FOREIGN PATENT DOCUMENTS

| | | |
|---|---|---|
| CN | 110899501 A | 3/2020 |
| EP | 3 406 750 A1 | 11/2018 |

(Continued)

OTHER PUBLICATIONS

Written Opinion of the International Searching Authority as issued in International Patent Application No. PCT/FR2021/051832, dated Jan. 28, 2022.

(Continued)

*Primary Examiner* — Matthew P Travers
(74) *Attorney, Agent, or Firm* — Pillsbury Winthrop Shaw Pittman LLP

(57) ABSTRACT

A method for manufacturing annular sectors of an air intake lip includes arranging a revolution-shaped blank facing a three-dimensional forming surface of a die of a hydroforming tool, the three-dimensional surface including at least two plunging cavities spaced from each other along a circumferential direction, forming an air intake lip preform in one piece by hydroforming the revolution-shaped blank on the three-dimensional surface of the die, the air intake lip (Continued)

preform having in section a U-shape and including a plurality of crenellated portions each delimited by a plunging cavity, the production of a plurality of cutouts in the air intake lip preform so as to divide the preform into a plurality of annular sectors, each cutout including the removal of a sacrificial portion at the level of a crenellated portion so as to form two adjacent assembly edges with one of the two adjacent assembly edges including a plunging.

5 Claims, 8 Drawing Sheets

(51) Int. Cl.
- *F02C 7/04* (2006.01)
- *B23P 11/00* (2006.01)
- *B21D 26/047* (2011.01)
- *B21D 53/92* (2006.01)

(52) U.S. Cl.
CPC .............. *B21D 53/92* (2013.01); *B23P 11/00* (2013.01); *F02C 7/04* (2013.01); *B23P 2700/01* (2013.01); *F05D 2230/60* (2013.01)

(58) Field of Classification Search
CPC ......... B21D 51/16; B21D 53/92; B23P 11/00; B23P 15/00; B23P 2700/01; B64C 7/02; B64D 29/00; B64D 33/02; F02C 7/04
See application file for complete search history.

(56) References Cited

U.S. PATENT DOCUMENTS

| | | | |
|---|---|---|---|
| 2011/0162429 A1* | 7/2011 | Leacock | B21D 25/04 72/296 |
| 2015/0367395 A1* | 12/2015 | Ludlow | B21D 25/04 72/352 |
| 2018/0127108 A1 | 5/2018 | Lebeda et al. | |
| 2018/0236526 A1* | 8/2018 | Ludlow | B21D 25/02 |
| 2019/0099835 A1 | 4/2019 | Bol | |
| 2020/0246859 A1* | 8/2020 | Douglas | B64F 5/10 |
| 2021/0237139 A1* | 8/2021 | Douglas | B21D 22/22 |

FOREIGN PATENT DOCUMENTS

| | | |
|---|---|---|
| FR | 2 943 317 A1 | 9/2010 |
| WO | WO 2012/116999 A1 | 9/2012 |

OTHER PUBLICATIONS

International Search Report as issued in International Patent Application No. PCT/FR2021/051832, dated Jan. 28, 2022.

* cited by examiner

[Fig. 1]
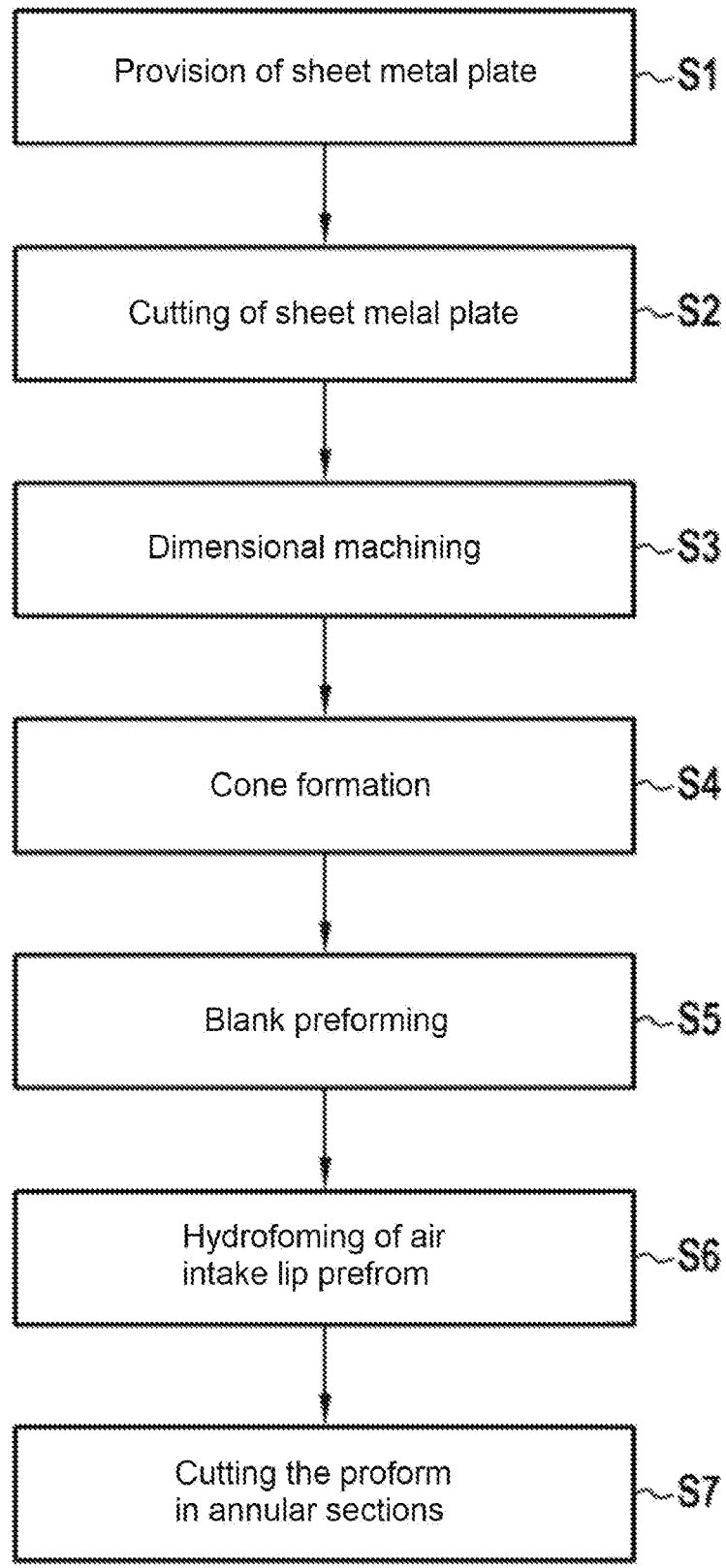

[Fig. 2]
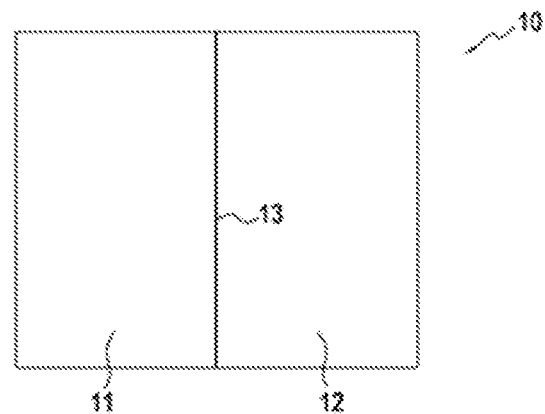
[Fig. 3]
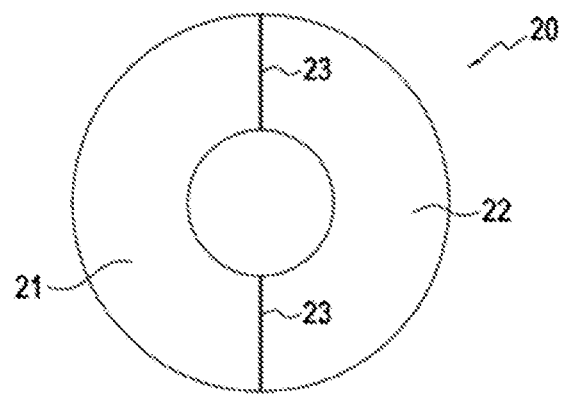
[Fig. 4]
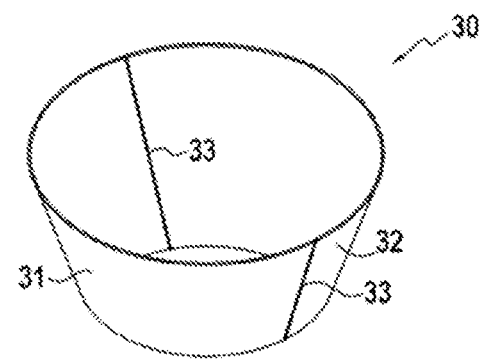

[Fig. 5]
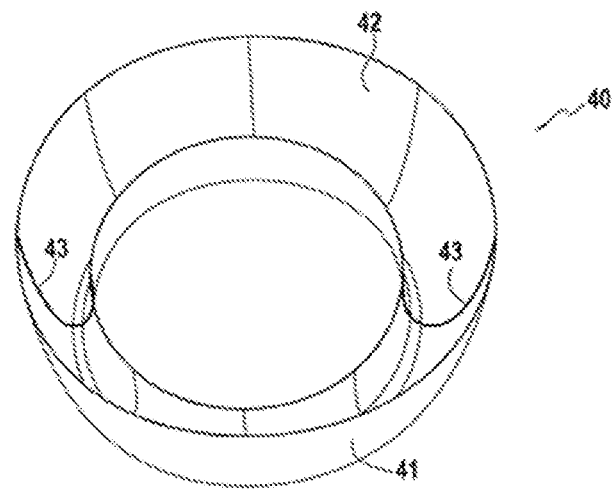
[Fig. 6]
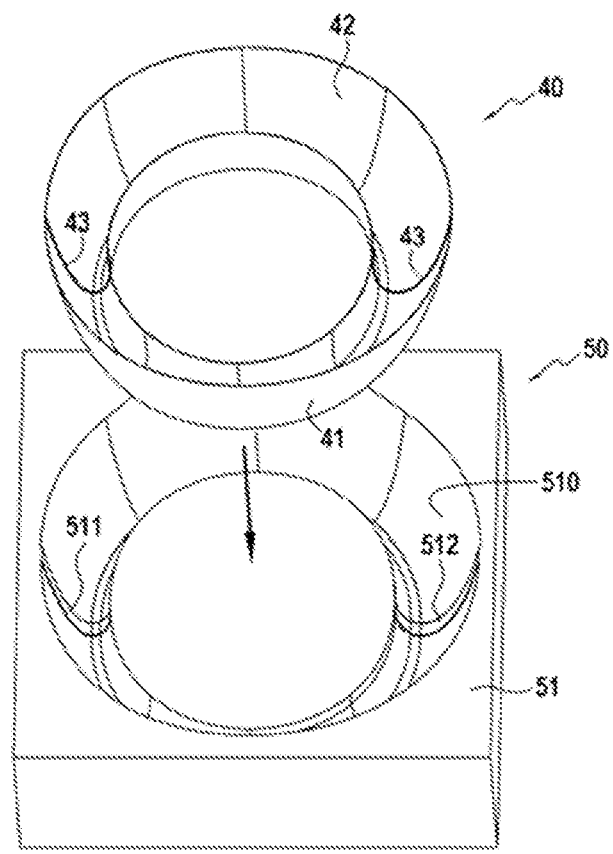

[Fig. 7]
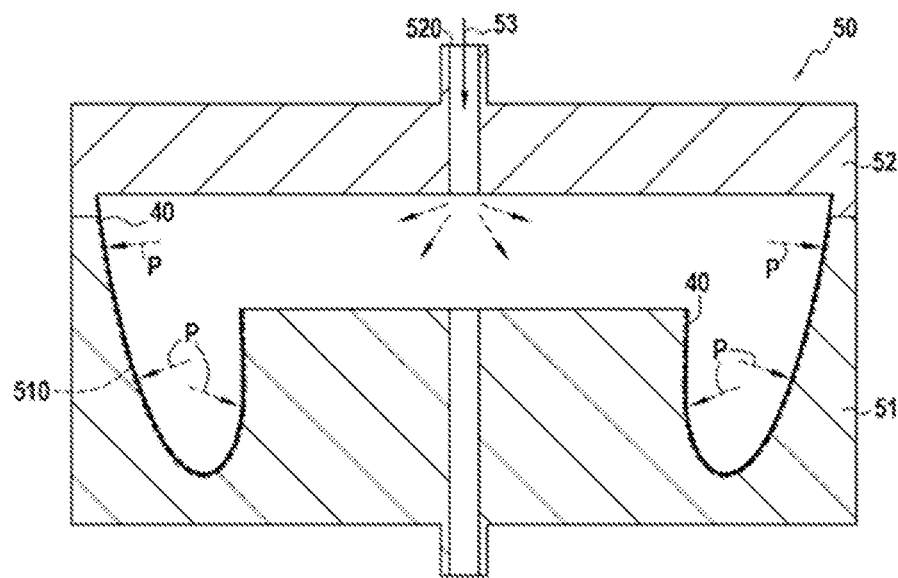
[Fig. 8]
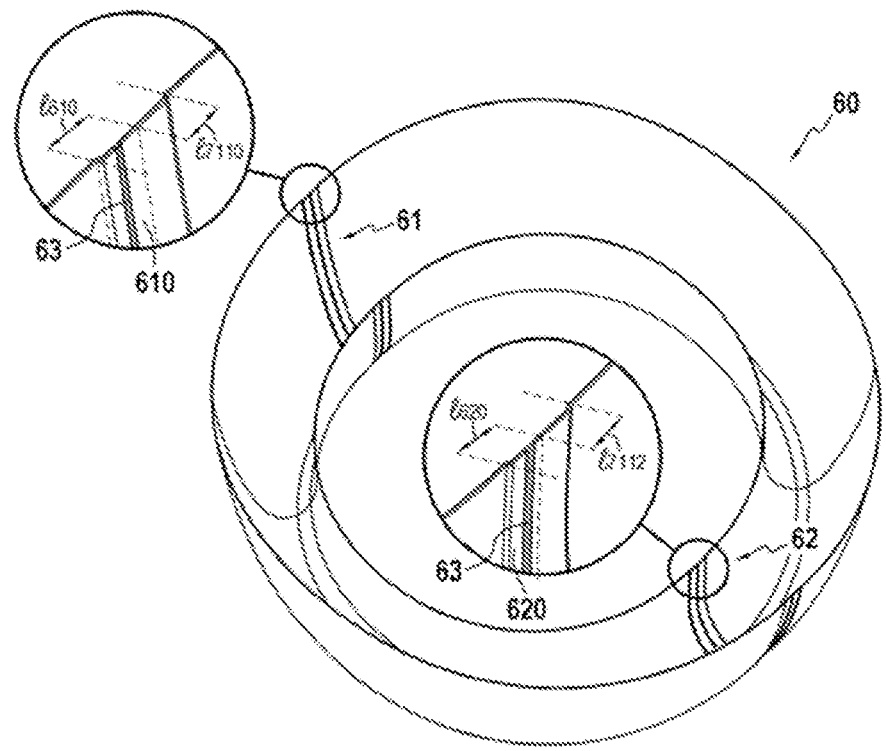

[Fig. 9]
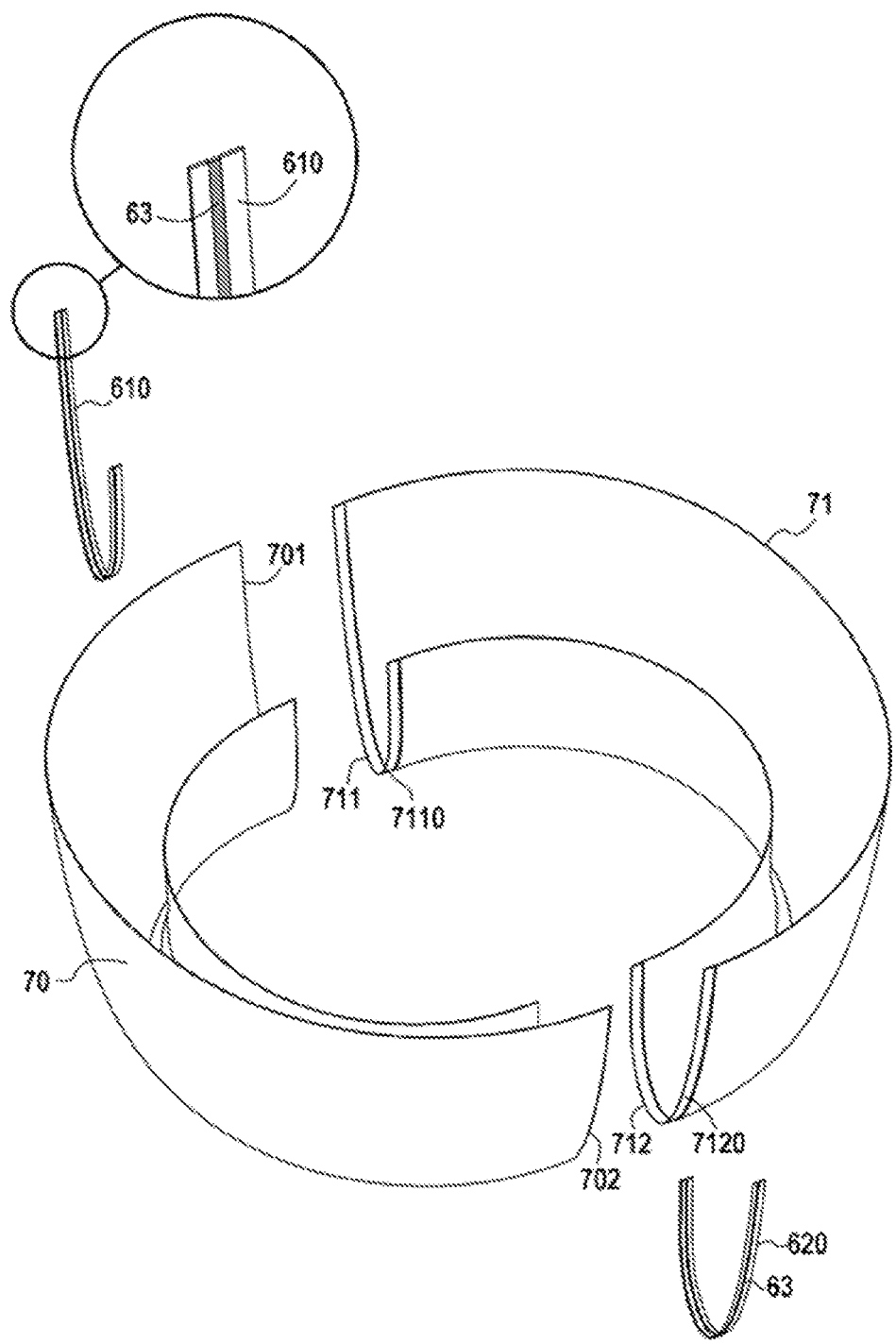

[Fig. 10]
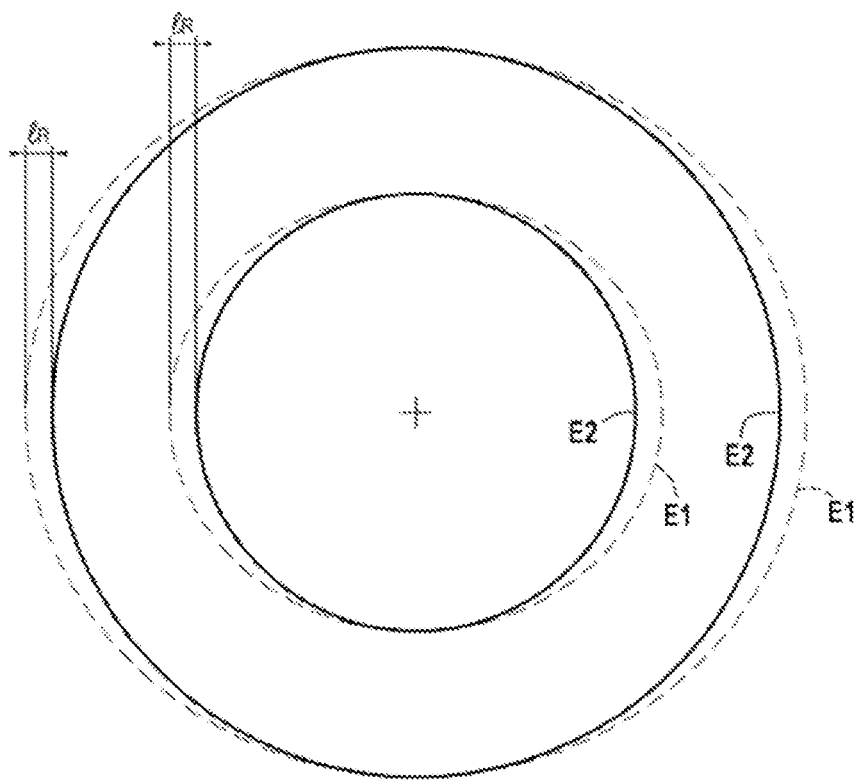

[Fig. 11]
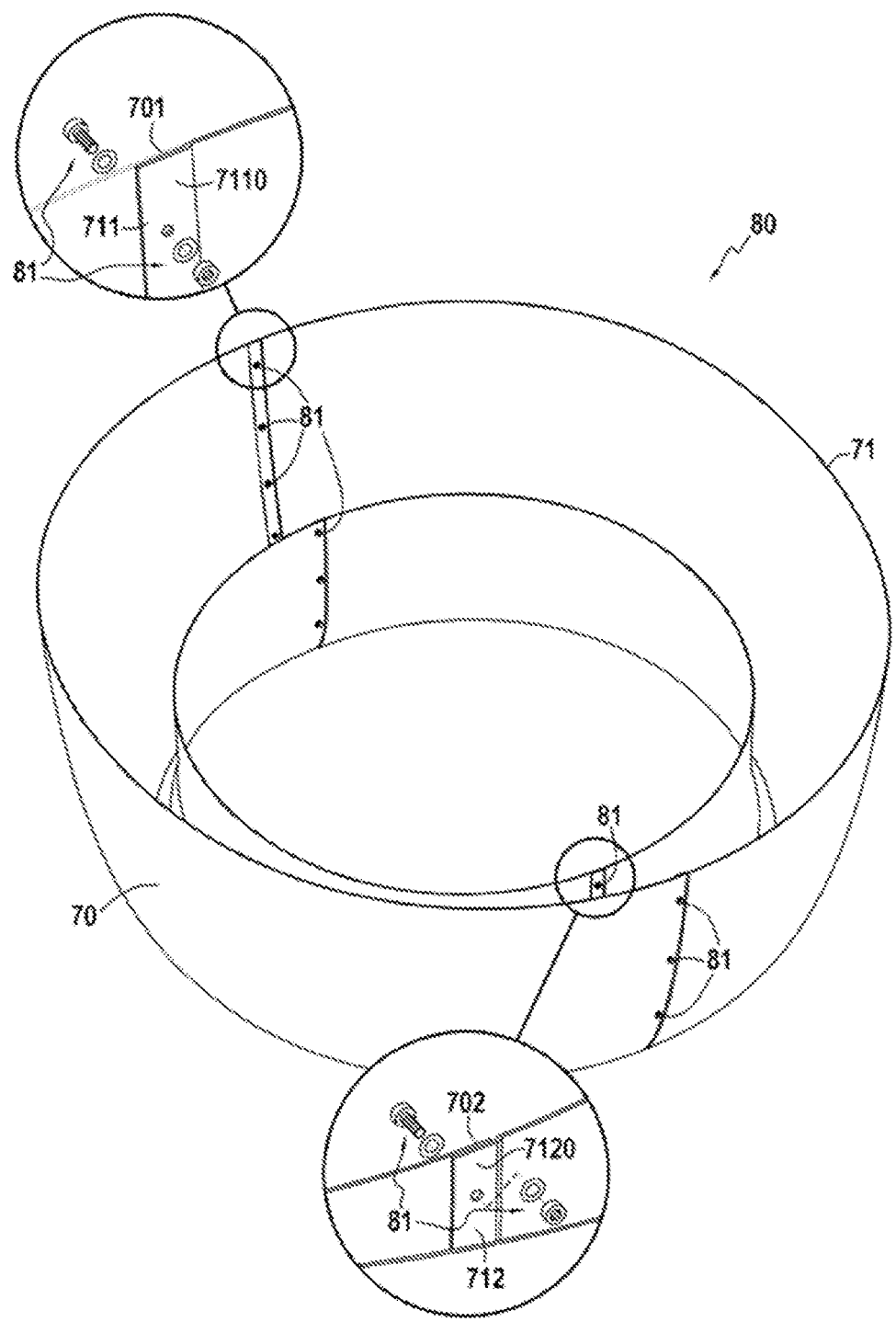

[Fig. 12A]
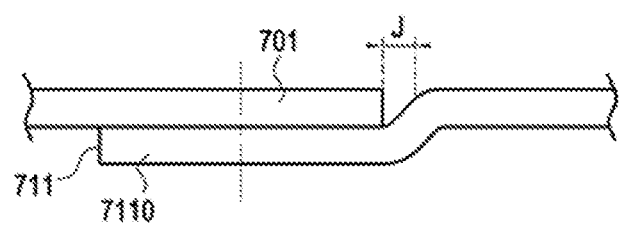
[Fig. 12B]
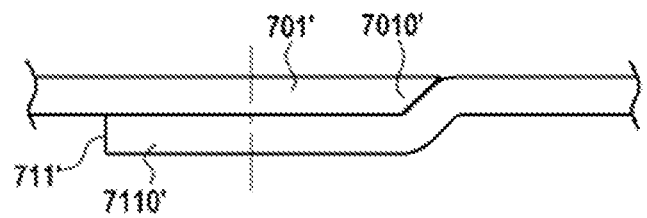

MANUFACTURE OF ANNULAR SECTORS FOR PRODUCING AN AIR INTAKE LIP

CROSS-REFERENCE TO RELATED APPLICATIONS

This application is the U.S. National Stage of PCT/FR2021/051832, filed Oct. 20, 2021, which in turn claims priority to French patent application number 20 10781 filed Oct. 21, 2020. The content of these applications are incorporated herein by reference in their entireties.

TECHNICAL FIELD

The present invention relates to the manufacture of air intake lips of aeronautical engine nacelles.

PRIOR ART

The nacelles of aeronautical engines include an air intake cowl extended at the front by a lip having in section a U-shape open towards the rear. The air intake lip has in particular the function of ensuring the aerodynamic flow of the air, on the one hand, towards the fan channel and, on the other hand, towards the outside of the nacelle.

The large-sized air intake lips (diameter greater than one meter) are generally manufactured from several individual annular sectors assembled together subsequently, this in particular makes it easier to transport and repair the air intake lips.

The annular sectors are individually manufactured by sheet metal forming and more specifically by spin forming. The assembly of the sectors is carried out with fishplates arranged inside the sectors. Each fishplate is then fixed by screwing or riveting from the outside.

However, the manufacture of air intake lips by assembling annular sectors has drawbacks. Particularly, the assembly of the sectors leads to adjustment problems that can make it difficult to meet the geometric tolerances. Radial and/or axial offsets can occur between adjacent annular sectors, thereby affecting the aerodynamic profile of the air intake lip.

However, there is a need for the manufacture of air intake lips by assembling annular sectors for ensuring a precise adjustment between the annular sectors.

DISCLOSURE OF THE INVENTION

To this end, the invention proposes a method for manufacturing annular sectors of an air intake lip comprising:
 the arrangement of a revolution-shaped blank facing a three-dimensional forming surface of a die of a hydroforming tool, the three-dimensional surface comprising at least two plunging cavities spaced from each other along a circumferential direction,
 the forming of an air intake lip perform in one piece by hydroforming the revolution-shaped blank on the three-dimensional surface of the die, the air intake lip preform having in section a U-shape and comprising a plurality of crenellated portions each delimited by a plunging cavity,
 the production of a plurality of cutouts in the air intake lip preform so as to divide said preform into a plurality of annular sectors, each cutout comprising the removal of a sacrificial portion at the level of a crenellated portion so as to form two adjacent assembly edges with one of the two adjacent assembly edges including a plunging.

Thus, by producing the annular sectors from a one-piece preform, a very good geometric and dimensional correspondence between the annular sectors is ensured, which allows precise assembly between the sectors without adjustment problems. The presence of a plunging on one of the assembly edges between two adjacent annular sectors simplifies and facilitates the assembly of the sectors together, in particular because it is no longer necessary to use fishplates. The advantages of the production of an air intake lip from annular sectors are thus retained, in particular in terms of transport and repair, while eliminating the problems of adjustment between the sectors during the production of the air intake lip.

According to one particular characteristic of the method of the invention, the three-dimensional forming surface has the shape of an ellipse with a diameter determined according to the final shape of the air intake lip. The geometry and the dimensions of the three-dimensional surface of the die are thus adapted according to the geometry and dimensions of the final air intake lip to be obtained in particular by taking into account the removal of the sacrificial portions and the overlapping of the adjacent edges of the assembled sectors.

According to another particular characteristic of the method of the invention, the revolution-shaped blank is formed of a plurality of sheet metal parts assembled together by weld beads, the revolution-shaped blank being arranged facing the three-dimensional forming surface of the die so that the position of at least part of the weld beads coincides with the position of sacrificial portions. Annular sectors devoid of weld beads are thus obtained, which makes it possible to obtain, after assembly, an air intake lip with a regular aerodynamic profile.

The object of the invention is also a method for manufacturing an air intake lip comprising the production of annular air intake lip sectors according to the invention and the assembly of the sectors by overlapping between the adjacent assembly edges and fixing of said adjacent assembly edges together so as to obtain an air intake lip. After assembly of the annular sectors, an air intake lip is thus obtained, having an improved aerodynamic profile compared to an air intake lip manufactured by assembling individually produced annular sectors, that is to say not initially extracted from the same piece.

According to one particular characteristic of the method of the invention, the fixing of the adjacent assembly edges is carried out with dismountable connecting members. This makes it possible to facilitate the repair of the lip, particularly the replacement of one or more damaged sectors.

Another object of the invention is an air intake lip comprising a plurality of annular sectors assembled together, the connection between two adjacent annular sectors comprising the overlapping between an assembly edge for one of the two annular sectors and a plunged assembly edge for the other annular sector and the fixing of said overlapping assembly edges. The presence of a plunging on one of the assembly edges between two adjacent annular sectors simplifies and facilitates the assembly of the sectors together, in particular because it is no longer necessary to use fishplates. The advantages of the production of an air intake lip from annular sectors are thus retained, in particular in terms of transport and repair, while reducing the adjustment problems between the sectors during the production of the air intake lip and lightening the overall mass of the lip.

According to one particular characteristic of the lip of the invention, each annular sector is devoid of weld beads. The air intake lip in this case has a regular aerodynamic profile.

According to another particular characteristic of the lip of the invention, the fixing of the adjacent assembly edges is carried out with dismountable connecting members.

BRIEF DESCRIPTION OF THE DRAWINGS

FIG. 1 is a flowchart showing the steps of a method for manufacturing annular sectors of an air intake lip in accordance with one embodiment of the invention, FIG. 2 is a schematic view of a sheet metal plate, FIG. 3 is a diagram of a ring obtained after cutting the sheet metal plate of FIG. 1, FIG. 4 is a schematic perspective view of a truncated cone obtained from the ring of FIG. 3, FIG. 5 is a schematic perspective view of an air intake lip blank obtained from the truncated cone of FIG. 4, FIG. 6 is a schematic perspective view showing the arrangement of the blank of FIG. 5 in a hydroforming tool, FIG. 7 is a schematic sectional view of the hydroforming tool of FIG. 6 once closed and in operation, FIG. 8 is a schematic perspective view of an air intake lip preform after hydroforming the blank of FIG. 5 in the hydroforming tool of FIGS. 6 and 7, FIG. 9 is a perspective view showing the cutting of annular air intake lip sectors from the lip preform of FIG. 8, FIG. 10 shows the dimensions of an air intake preform compared to the dimensions of a final air intake lip, FIG. 11 is a schematic perspective view of an air intake lip obtained after assembly of the annular sectors of FIG. 9, FIG. 12A is a schematic view showing two assembly edges for two annular sectors with a residual clearance, FIG. 12B is a schematic view showing two assembly edges for two annular sectors with a residual clearance.

DESCRIPTION OF THE EMBODIMENTS

The invention generally applies to the production of air intake lips for aeronautical engine nacelles.

FIG. 1 describes the steps of a method for manufacturing annular sectors for the production of an air intake lip in accordance with the invention.

As illustrated in FIG. 2, the method begins with the provision of a sheet metal plate 10, for example made of aluminum alloy (step S1). In the example described here, the sheet metal 10 is obtained by assembling two sheet metal plates 11 and 12 fixed together by a weld bead 13. This makes it possible to obtain large-sized sheet metal plates from smaller unit sheet metal plates. Depending on the dimensions of the final lip, it is also possible to use a single sheet metal plate.

The sheet metal plate 10 is then cut to form a ring 20 illustrated in FIG. 3 (step S2). The ring 20 comprises two sheet metal parts 21 and 22 corresponding respectively to the sheet metal plates 11 and 12 connected together by two diametrically opposite weld beads 23 and resulting from the weld bead 13 present on the sheet metal plate 10.

The ring 20 is mechanically machined in thickness so as to obtain a constant sheet metal thickness after shaping (step S3).

A truncated cone 30 illustrated in FIG. 4 is then formed from the ring 20 by the known technique of the sheet metal rolling (step S4). The truncated cone 30 comprises two parts 31 and 32 corresponding respectively to the parts 21 and 22 of the ring 20 connected together by two diametrically opposite weld beads 33 and corresponding to the weld beads 23 present on the ring 20.

Once formed, the cone 30 is preformed, for example by embossing and/or stamping, into a lip blank 40 having a general shape similar to that of the final lip, that is to say already having in section a U-shape as represented in FIG. 5 (step S5). The blank 40 comprises two sheet metal parts 41 and 42 corresponding respectively to the parts 31 and 32 of the cone 30 connected together by two weld beads 43 corresponding to the weld beads 33 present on the cone 30.

In accordance with the invention, the final shaping of an air intake lip preform is then carried out by hydroforming (step S6). It is meant here by "hydroforming" any method that allows plastically deforming the blank by the action of a pressurized fluid, of a shock wave (EletroHydroForming (EHF), of a magnetic field (magneto-forming), etc. In the example described here and as illustrated in FIG. 6, the blank 40 is arranged in a mold 51, also called die, of a hydroforming tool 50, the die 51 including a three-dimensional surface 510 corresponding to the shape of the lip preform to be obtained. The tool 51 is then hermetically closed by a lid 52 as illustrated in FIG. 7. The lid 52 includes an opening 520 through which a fluid 53 under high pressure is introduced. The high-pressure P of the fluid 53 exerted on the blank 40 forces the latter to take the shape of the three-dimensional surface 510 of the die 51. In the example described here, the three-dimensional surface 510 includes two diametrically opposite plunging ribs or cavities 511 and 512.

Once the hydroforming is complete, a one-piece air intake lip preform 60 is obtained as illustrated in FIG. 8. The air intake lip preform 60 has a shape of revolution, for example an ellipsoid of revolution, having in section a U-shape and comprises two weld beads 63 corresponding to the weld beads 43 present on the blank 40. The preform 60 further comprises two crenellated portions 61 and 62 each delimited by a plunging cavity 511 or 512 of the die 51.

The one-piece air intake lip preform is then cut into several annular sectors (step S7). In the example described here and as represented in FIG. 9, the air intake lip preform 60 is cut into two annular sectors 70 and 71 of equivalent dimensions, the cutouts being made at each crenellated portion 61, 62. As illustrated in FIG. 8, the cutting of the annular sectors at the level of each crenellated portion 61, respectively 62, comprises the removal of a sacrificial portion 610, respectively 620. The sacrificial portion 610, respectively 620, extends over a determined width 1610, respectively 1620, from part of the preform 60 located outside the crenellated portion 61, respectively 62, and up to an intermediate position of the crenellated portion 61, respectively 62. After each cutting, a first assembly edge is formed, including a plunging corresponding to the part of the crenellated portion that has not been removed and a second assembly edge without plunging. In FIG. 9, after the cutting of the preform 60 comprising the removal of the sacrificial portions 610 and 620, a first annular sector 70 is obtained, including two assembly edges 701 and 702 without plunging and a second annular sector 71 including two assembly edges 711 and 712 each provided with a plunging 7110, 7120. The assembly edge 701 is intended to overlap the plunging 7110 present on the adjacent assembly edge 711 while the assembly edge 702 is intended to overlap the plunging 7120 present on the adjacent assembly edge 712. It is meant here by "plunging" a bending of the sheet metal at the end of which two parallel planes are obtained, offset by a distance of the same order of magnitude as the thickness of sheet metal or more.

There is thus a plurality of annular sectors, in the example described here, two sectors 70 and 71, which have dimensions well suited in particular for the storage and the transport.

According to one particular aspect of the method of the invention, the position of the plunging cavities is made to coincide with all or part of the weld beads present on the lip blank such that, after the hydroforming, the weld bead(s) coincide with the position of the sacrificial portion(s). In the example described here, the blank 40 is arranged in the die 51 of the hydroforming tool so that the two weld beads 43 coincide respectively with the position of the plunging cavities 511 and 512 (FIG. 6). After hydroforming, the crenellated portions 61 and 62 each comprise a weld bead 63 present in the part of the portions 61 and 62 intended to be removed, namely the sacrificial portions 610 and 620 (FIG. 8). Thus, the removal of the sacrificial portions 610 and 620 also comprises the removal of the weld beads 63 (FIG. 9). Annular sectors devoid of weld beads are thus obtained, which makes it possible to obtain after assembly an air intake lip with a regular aerodynamic profile.

In the example described here, the annular sector 70 does not include a plunging at its ends while the annular sector 71 includes a plunging at each of its ends. Other variants of embodiment can of course be envisaged, such as, for example, providing annular sectors including an edge with plunging at one end and an edge without plunging at its other end.

Once the annular sectors have thus been produced, an air intake lip can then be manufactured by assembling the annular sectors together. FIG. 11 shows an air intake lip 80 obtained by assembling the annular sectors 70 and 71, the assembly edge 701 of the sector 70 overlapping the plunging 7110 present on the adjacent assembly edge 711 of the sector 71 while the assembly edge 702 overlaps the plunging 7120 present on the adjacent assembly edge 712 of the sector 71. There is no adjustment problem between the adjacent assembly edges because these have been made in the same piece (preform 60) and therefore have corresponding geometries and dimensions. Once adjusted with each other, the adjacent assembly edges are fixed with preferably removable connecting members 81, for example of the screw-bolt type.

The cutting of the sacrificial portions can be carried out perpendicularly to the surface of the piece. In this case, as illustrated in FIG. 12A, a residual clearance J is present between the end of the assembly edge 701 and the radius of the plunging 7110 present on the assembly edge 711. As illustrated in FIG. 12B, this residual clearance can be reduced by cutting a bevel 7010' on the assembly edge 701' which matches the shape of the radius of the plunging 7110' present on the assembly edge 711'.

The geometry and/or the dimensions of the air intake lip vary with respect to the geometry and/or the dimensions of the air intake lip preform due to the removal of a sacrificial portion at the level of each cut-out (lengths 1610 and 1620 in FIG. 8) and to the overlapping of the plunged assembly edges with the non-plunged assembly edges (17110 and 17120 in FIG. 8). Consequently, the geometry and the dimensions of the three-dimensional surface 510 of the die 51 are adapted according to the geometry and the dimensions of the final air intake lip to be obtained. If it is desired to obtain an oval-shaped air intake lip, a die will be used whose three-dimensional surface has the shape of an ellipse with a diameter greater than that of the final shape of the air intake lip as in FIG. 10 which schematically shows a first elliptical shape E1 corresponding to the air intake lip preform and a second elliptical shape E2 corresponding to the final air intake lip. The difference in dimensions IR between the elliptical shapes E1 and E2 corresponds to taking into account the removal of the sacrificial portions and the overlapping of the adjacent edges of the assembled sectors.

If it is desired to obtain a circular-shaped air intake lip, a die will be used, whose three-dimensional surface has circle portions corresponding to the annular sectors and extra-lengths between the circle portions corresponding to the sacrificial parts to be removed during the cutting of the sectors.

The invention claimed is:

1. A method for manufacturing annular sectors of an air intake lip comprising:
   arranging a revolution-shaped blank facing a three-dimensional forming surface of a die of a hydroforming tool, the three-dimensional surface comprising at least two plunging cavities spaced from each other along a circumferential direction,
   forming an air intake lip preform in one piece by hydroforming the revolution-shaped blank on the three-dimensional surface of the die, the air intake lip preform having in section a U-shape and comprising a plurality of crenellated portions each delimited by a respective one of the plunging cavities,
   producing a plurality of cutouts in the air intake lip preform so as to divide said preform into a plurality of annular sectors, each cutout comprising removal of a sacrificial portion at a level of a respective one of the crenellated portions so as to form two adjacent assembly edges with one of the two adjacent assembly edges including a plunging.

2. The method according to claim 1, wherein the three-dimensional forming surface has the shape of an ellipse with a diameter determined according to a final shape of the air intake lip.

3. The method according to claim 1, wherein the revolution-shaped blank is formed of a plurality of sheet metal parts assembled together by weld beads and wherein the revolution-shaped blank is arranged facing the three-dimensional forming surface of the die so that a position of at least part of the weld beads coincides with a position of the sacrificial portions.

4. A method for manufacturing an air intake lip comprising performing the method for manufacturing annular sectors of an air intake lip according to claim 1 and an assembly of said sectors by overlapping between the adjacent assembly edges and fixing of said adjacent assembly edges together so as to obtain an air intake lip.

5. The method according to claim 4, wherein the fixing of the adjacent assembly edges is carried out with dismountable connecting members.

\* \* \* \* \*